United States Patent
Hachmann et al.

(10) Patent No.: US 6,312,327 B1
(45) Date of Patent: Nov. 6, 2001

(54) VANDAL RESISTANT FRESH AIR FILTER HOUSING

(75) Inventors: Robert Joseph Hachmann, Peosta; Timothy Aloysius Averkamp; Stuart Lee Neagle, both of Dubuque, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/651,496

(22) Filed: Aug. 30, 2000

(51) Int. Cl.⁷ ...................................................... B60H 3/06
(52) U.S. Cl. ................................ 454/158; 55/493; 55/505
(58) Field of Search ............................. 454/158, 147, 454/149; 55/385.2, 482, 482.1, 493, 505

(56) References Cited

U.S. PATENT DOCUMENTS

| | | |
|---|---|---|
| 4,137,983 * | 2/1979 | Gray . |
| 4,290,792 * | 9/1981 | Eckstein et al. . |
| 4,365,541 | 12/1982 | Marques et al. . |
| 4,660,462 | 4/1987 | Thompson et al. ................ 454/158 |
| 4,989,500 | 2/1991 | Anliker et al. ................... 454/158 |
| 5,119,718 * | 6/1992 | Wagner et al. .................. 454/158 |
| 5,385,378 * | 1/1995 | Hakamada et al. . |
| 5,833,528 * | 11/1998 | Baum et al. ..................... 454/158 |

FOREIGN PATENT DOCUMENTS

| | | | |
|---|---|---|---|
| 42 24 051-A * | 1/1994 | (DE) ................................ 454/158 |
| 57-155118-A * | 9/1982 | (JP) ................................ 454/158 |

* cited by examiner

Primary Examiner—Harold Joyce

(57) ABSTRACT

Fresh air enters the operator's cab of a work vehicle through a fresh air filter. The fresh air filter is mounted to the operator's cab and is held in place by a door. The door is pivotally mounted to the exterior of the operator's cab, so that the fresh air filter can be serviced from outside the operator's cab. The door is held in place by a latch having a handle that is located inside the operator's cab. The housing is a plastic molded door having integral pivot studs that pivotally engage the operator's cab. The door is provided with a back wall having a first opening located adjacent to the filter and through which fresh air passes to the filter. The door is also provided with louvers for providing a pneumatic path for fresh air to reach the filter. The pneumatic path extends first upwardly from the louvers and then downwardly towards the filter.

23 Claims, 4 Drawing Sheets

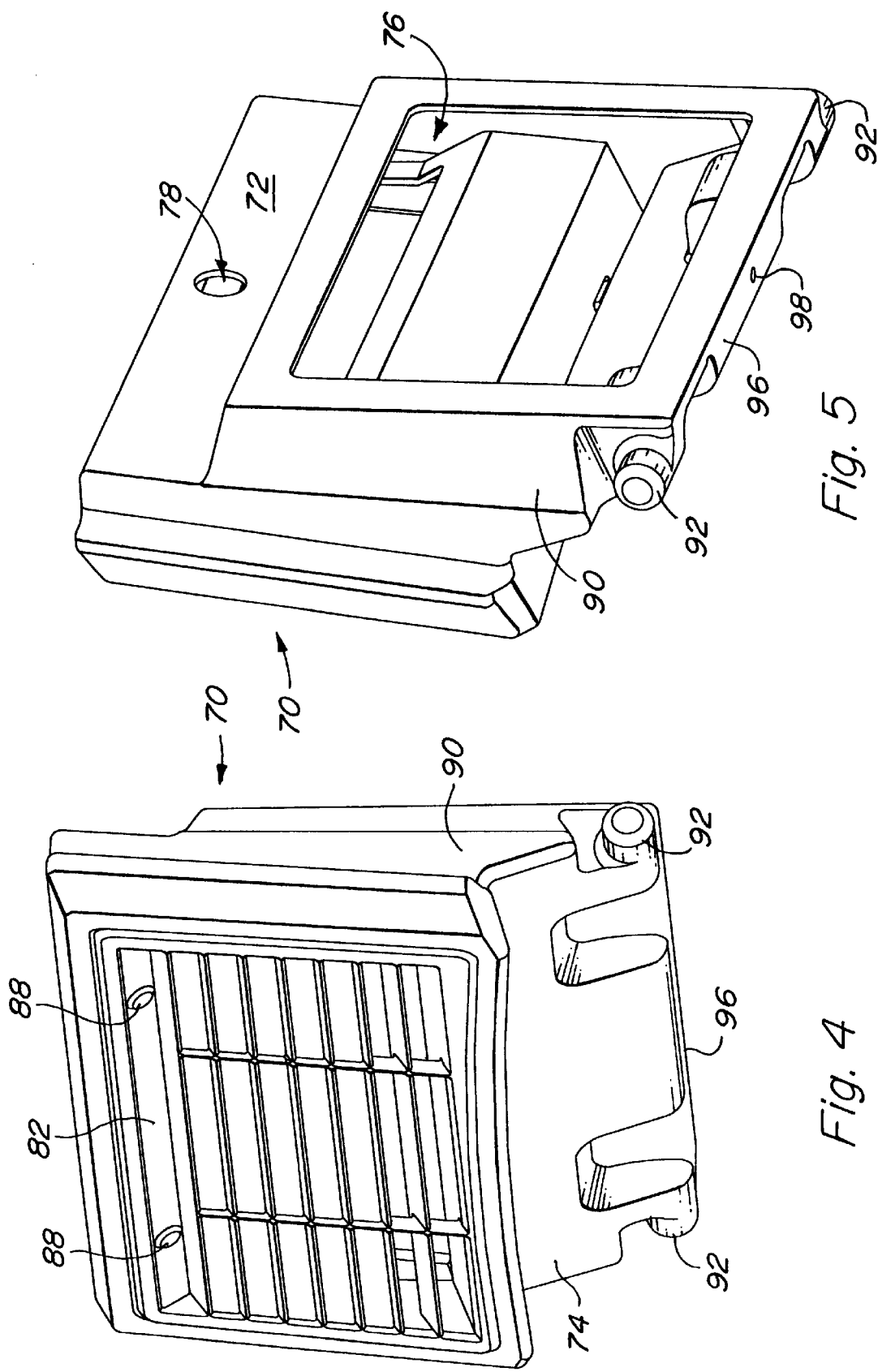

VANDAL RESISTANT FRESH AIR FILTER HOUSING

BACKGROUND OF THE INVENTION

1. Field of the Invention

The present invention is directed to a vandal resistant housing for a fresh air filter for an off road work vehicle. The housing is latched to the operator's cab by a latch located inside the operator's cab. The housing is removed from outside the operator's cab allowing servicing of the filter.

2. Description of the Prior Art

Off road work vehicles may be provided with operator's cabs. These cabs in turn are provided with heating, ventilating and air conditioning (HVAC) systems to provide operator comfort in a variety of climatic conditions. These systems draw fresh outside air into the operator's cab through a fresh air filter. It is desirable that the fresh air filter be serviced from outside the operator's cab. This prevents dirt and dust collected by the filter from being deposited into the cab. One problem with this arrangement is that vandals sometimes take these filters.

SUMMARY

It is an object of the present invention to provide a fresh air filter that can be serviced from outside the operator's cab and that can only be serviced by persons having access to the interior of the operator's cab.

It is a feature of the present invention that the fresh air filter is held in place by a housing that is latched in place by a latch located inside the operator's cab.

The operator's cab of a work vehicle defines an enclosed space from which the operator controls the vehicle. This enclosed space is locked to prevent unauthorized access. The operator's cab is provided with a HVAC system, the HVAC system having a fresh air filter for introducing filtered fresh air to the HVAC system. The fresh air filter is mounted to the operator's cab and is held in place by a housing. The housing comprises a pivotal door that is mounted to the exterior of the operator's cab. The housing is held in place by a latch having a handle that is located inside the operator's cab.

The housing is a plastic molded door having integral pivot studs that pivotally engage the operator's cab. The door is provided with a back wall having a first opening located adjacent to the filter and through which fresh air passes to the filter. The door is also provided with louvers for providing a pneumatic path for fresh air to reach the filter. The pneumatic path extends first upwardly from the louvers and then downwardly towards the filter. The back wall of the door is also provided with a latch hole into which a latch extends.

In the illustrated embodiment the latch comprises an expandable rubber sleeve. The expandable rubber sleeve is compressed between a jam nut and the back wall to expand the sleeve and latch the door in place. The jam nut Is mounted to a rod. The rod is slidably positioned in a fixed washer assembly. The other end of the rod opposite the jam nut is mounted to a latch handle. The latch handle has a camming surface defining a latched position and an unlatched position. The rubber sleeve is mounted on the rod between the jam nut and the washer assembly. When moving the handle to its latched position, the rod is withdrawn towards the operator's cab. As the rubber sleeve is trapped between the jam nut and the washer assembly, the sleeve bulges outwardly latching the door in a closed position as the latch hole is smaller than the bulged rubber sleeve.

BRIEF DESCRIPTION OF THE DRAWINGS

FIG. 4 is a front perspective view of the filter housing.

FIG. 5 is a rear perspective view of the filter housing.

DETAILED DESCRIPTION

Figure 1:
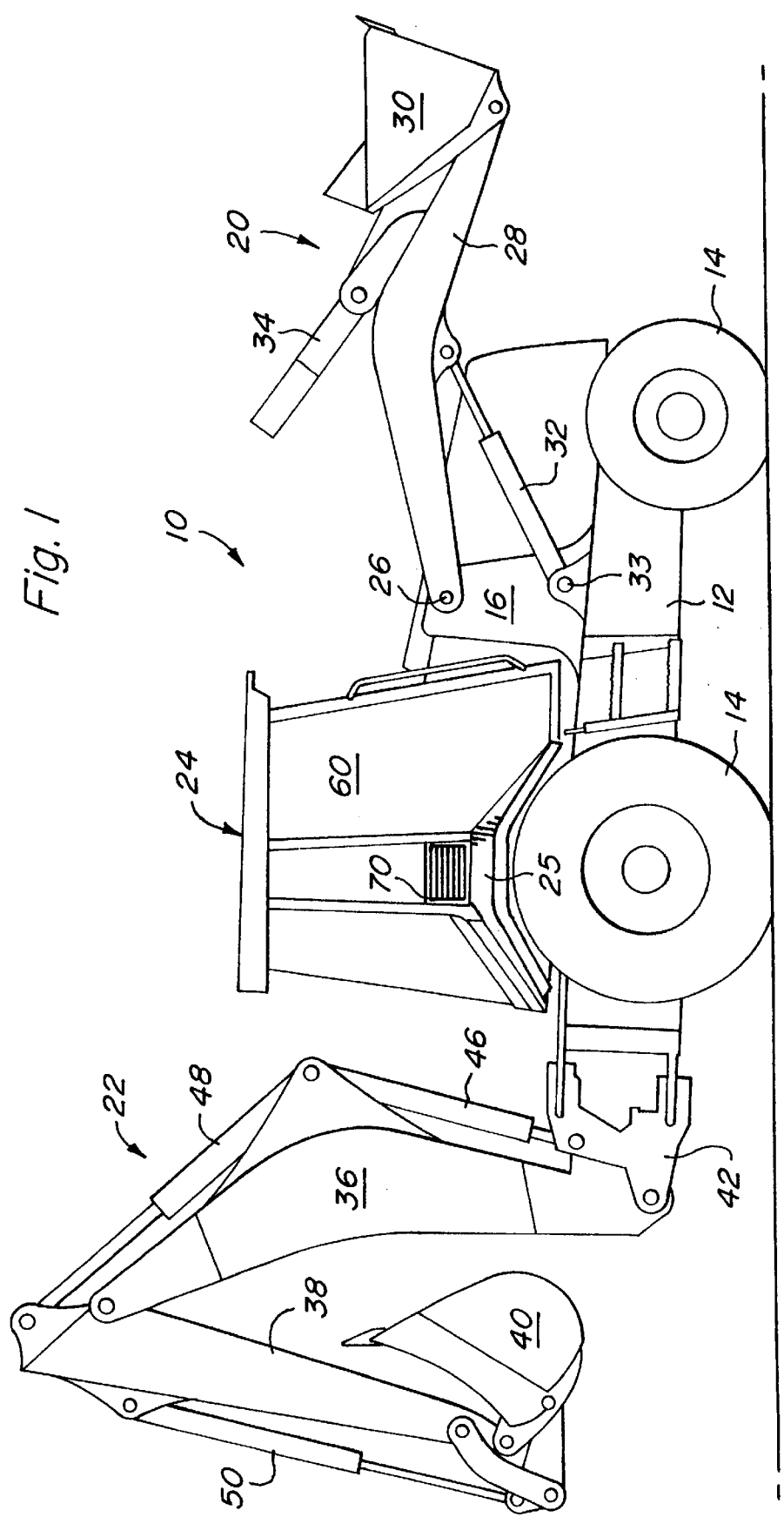
FIG. 1 is a side view of an off road work vehicle having an operator's cab.
Figure 2:
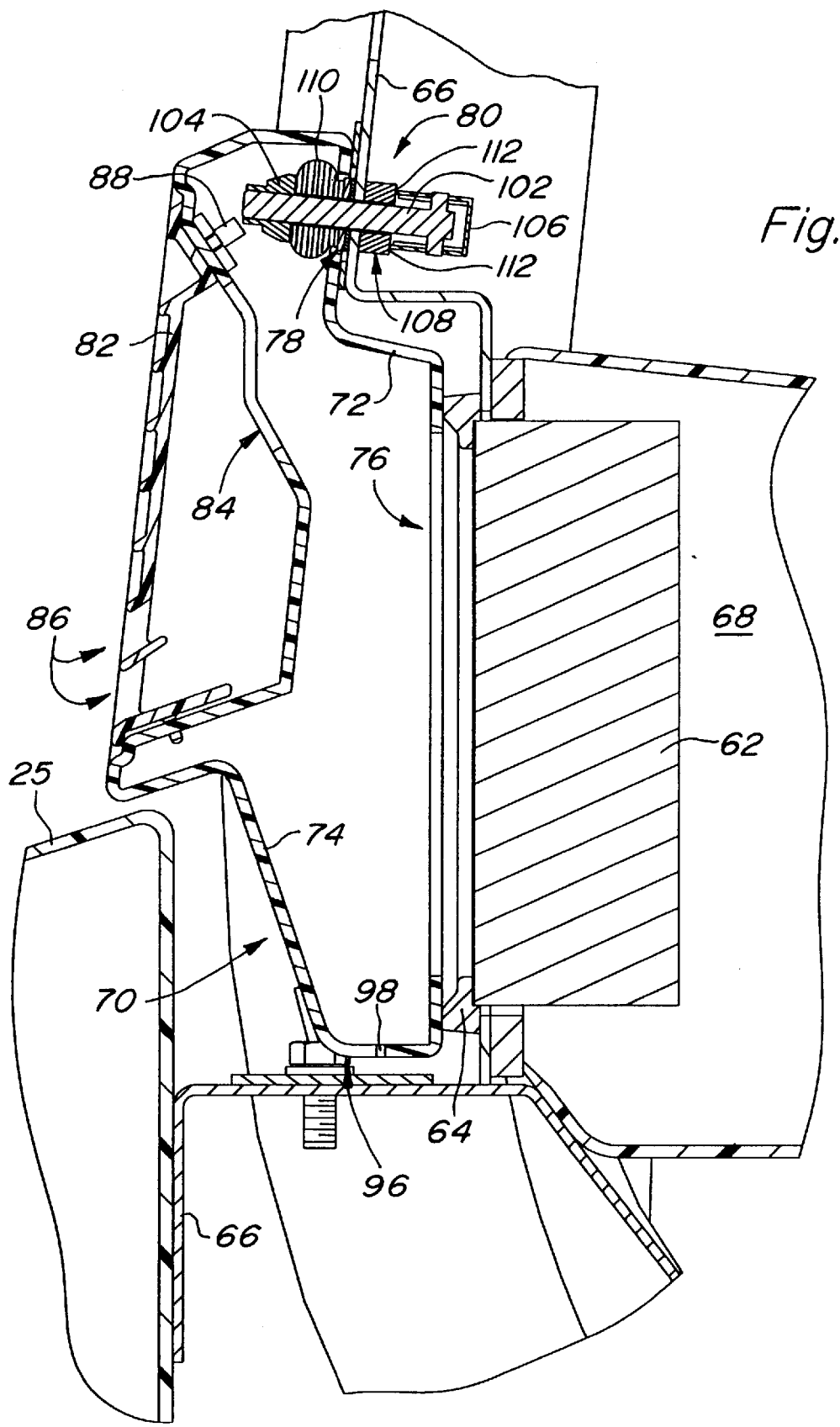
FIG. 2 is a partial cross sectional front view of the operator's cab, fresh air filter and filter housing.
Figure 3:
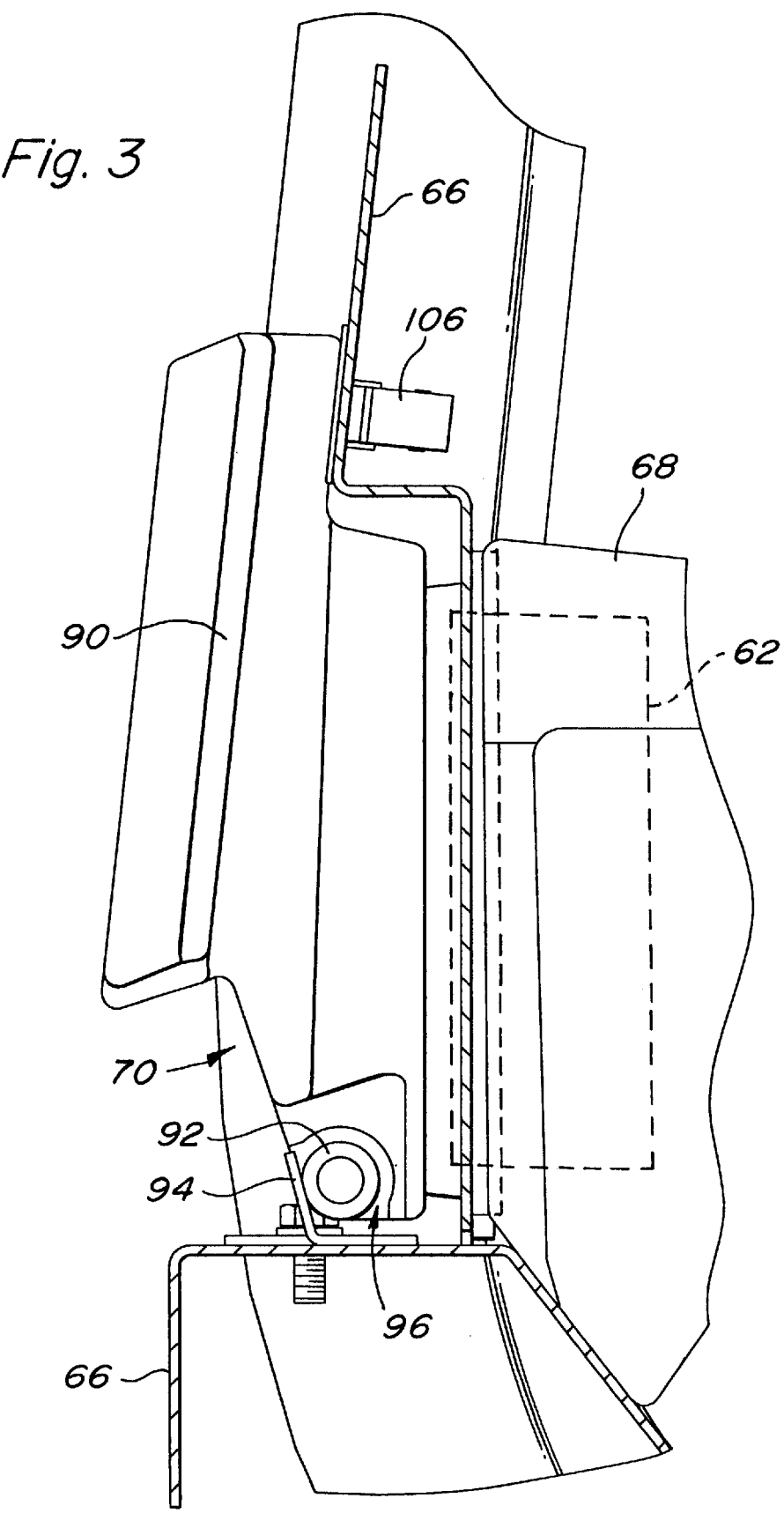
FIG. 3 is a partial cross sectional front view of the operator's cab, fresh air filter and filter housing.

The off road work vehicle 10 illustrated in FIG. 1 is a backhoe loader. The work vehicle 10 is provided with a supporting structure 12 and ground engaging means 14 comprising wheels, which support and propel the supporting structure 12. Although the ground engaging means 14 of the illustrated embodiment are wheels, the present invention could also be used on tracked work vehicles having steel or rubber tracks. The supporting structure 12 is provided with a vertically extending mast 16. A first work implement 20 comprising a loader is operatively mounted to the mast 16 and the supporting structure 12. A second work implement 22 comprising a backhoe is mounted to the back of the supporting structure 12. The operation of the work vehicle 10 and the operation of the first and second work implements 20 and 22 are controlled from operator's cab 24. The rear drive wheels are provided with a fender 25 that is mounted to the operator's cab 24.

The loader 20 comprises lift arms 28 and a bucket 30. The lift arms 28 are pivotally mounted to the mast 16 at pivots 26. The lift arms 28 are provided with lift arm hydraulic cylinders 32 for lifting the arms 28 relative to the supporting structure 12. The lift arm hydraulic cylinders 32 are pivotally coupled to the supporting structure 12 at pivots 33. The bucket 30 is pivotally mounted to the end of the lift arms 28. Bucket 30 is provided with a bucket-tilt hydraulic cylinder 34 for tilting the bucket 30 relative to the lift arms 28.

The backhoe 22 is mounted to the back 18 of the supporting structure 12 and comprises a boom 36, a dipperstick 38 and a bucket 40. The boom 36 is pivotally coupled to a swing frame 42 about a vertical pivot and is raised and lowered relative to the swing frame 42 by a boom hydraulic cylinder 46. The dipperstick 38 is pivotally mounted to the boom about a horizontal axis and is pivoted relative to the boom 36 by dipperstick hydraulic cylinder 48. The bucket 40 is curled and uncurled relative to the dipperstick 38 by bucket hydraulic cylinder 50.

In the illustrated embodiment the swing frame 42 is pivotally coupled to the support structure 12. The swing frame 42 is pivoted relative to the supporting structure by swing frame hydraulic cylinders, not shown. The swing frame 42 could also be mounted to a side shift structure located between the swing frame 42 and the supporting structure for laterally shifting the swing frame relative to the supporting structure 12. The backhoe would normally be provided with stabilizers, not shown.

The operator's cab 24 defines an enclosed space from which the operator controls the vehicle. The operator's cab 24 is provided with left and right access doors 60 and windows. To prevent unauthorized access into the enclosed space, the doors 60 are provided with locks and the window are latched from inside the enclosed space. The operator's cab is provided with a HVAC system, not shown for providing operator comfort in a variety of climatic conditions. Fresh air from the exterior of the operator's cab passes through a fresh air filter 62. The fresh air filter is provided with a mounting gasket 64 that mates up against exterior wall 66 of the operator's cab 24. The mounting gasket forms an air tight seal with the exterior wall 66. The fresh air filter 62 fits into an opening formed in the exterior wall 66. Air passing through the filter is directed into fresh air duct 68 of the HVAC system.

The filter is held in place in the opening by a housing. The housing comprises a door 70 having a back wall 72 and a front wall 74. The back wall is provided with a first opening 76 through which fresh air is directed to the filter 62. The periphery of the back wall adjacent to the first opening 76 engages the mounting gasket 64 to form an air tight seal between the back wall 72 and the filter 62. The back wall 72 is provided with a second opening comprising a latch hole 78 for receiving latch 80.

The front wall 74 is provided with louvers 82 covering a fresh air opening 84 formed in the front wall. The louvers 82 define a first louvered opening 86 through which fresh air passes to fresh air opening 84. The louvered opening 86 is lower than the fresh air opening 84 so that fresh air must pass upwardly thereby restricting rain water from entering the filter. The pneumatic path from the fresh air opening 84 to the first opening 76 in the back wall 72 proceeds downwardly. The louvers 82 are mounted to the door 70 by rivets 88.

The door 70 is provided with two side walls 90 each having an integrally formed pivot stud 92. The studs 92 define a pivot axis for the door 70. The pivot studs 92 are pivotally received in a sheet metal bracket 94 bolted to the fender 25. The metal brackets 94 do not totally enclose the pivot studs 92 so that the door can be removed after it has been pivoted outwardly. The door 70 is a roto-molded plastic part. It is also provided with a bottom wall 96 that is provided with a drain hole 98 through which water can drain.

The door 70 is held in place by latch 80. In the illustrated embodiment, the latch comprises an axially slidable rod 102 having a jam nut 104 at one end and a latch handle 106 at the other end. A washer assembly 108 provides a fixed path in which the rod can slide. The washer assembly 108 comprises two washers that sandwich the exterior wall 66 there between. A rubber sleeve 110 is mounted to the rod between the jam nut 104 and washer assembly 108. The latch handle 106 is provided with camming surfaces 112 defining a latched position and an unlatched position. In the latched position the rod 102 is drawn towards the operator's cab 24 compressing the rubber sleeve 110 between the jam nut 104 and the fixed washer assembly 108. The rubber sleeve 110 bulges latching the door 70 to the operator's cab 24 as the latch hole 78 is smaller than the bulged rubber sleeve. In the unlatched position, the rod 102 extends away from the operator's cab 24 relieving the compression on the rubber sleeve 110 and allowing the sleeve to resume an unbulged cylindrical configuration.

Although the present invention is illustrated as using the above-described latch structure, other latch structures could be used. The only requirement is that the latch be located inside the operator's cab for releasing the housing to the outside.

When servicing the fresh air filter 62 the operator first enters the operator's cab 24 and moves the latch handle 106 to its unlatched position. The operator then exits the operator's cab 24 and pivots the door 70 outwardly on pivot studs 92. After the front wall 74 contacts the fender 25 the door 70 is lifted outwardly and upwardly removing the door from the operator's cab 24. The operator then can service the filter 62. To reinstall the door 70, the operator inserts the door inwardly and downwardly so that the pivot studs 92 engage the metal brackets 94. The door 70 is then pivoted inwardly towards the operator's cab 24. The operator then enters the cab 24 and latches the latch 80 to its latched position.

The invention should not be limited by the above-described embodiment, but should be limited solely by the claims that follow.

We claim:

1. A work vehicle for performing a work operation, the work vehicle comprising:
   a supporting structure;
   ground engaging means for propelling the supporting structure;
   an operator's cab mounted to the supporting structure defining an enclosed space, the operator's cab having an exterior wall having an opening for receiving a fresh air filter and a fresh air duct in pneumatic communication with the fresh air filter;
   a door is mounted to the operator's cab, the door having a back wall with a first opening for receiving fresh air, the first opening being in pneumatic communication with the fresh air filter;
   a latch for latching the door to the operator's cab, the latch having a handle for unlatching the latch, the handle being located in the enclosed space of the operator's cab.

2. A work vehicle as defined by claim 1 wherein the door is pivotally mounted to the operator's cab.

3. A work vehicle as defined by claim 2 wherein the door has a front wall with a fresh air opening for receiving fresh air, the fresh air opening being in pneumatic communication with the first opening.

4. A work vehicle as defined by claim 3 wherein the fresh air opening of the front wall is located above the first opening.

5. A work vehicle as defined by claim 4 wherein the front wall is provided with louvers defining a louvered opening for receiving fresh air the louvered opening being in pneumatic communication with the fresh air opening of the front wall.

6. A work vehicle as defined by claim 6 wherein the louvered opening is located below the fresh air opening of the front wall, so that fresh air must first pass through the louvered opening upwards to the fresh air opening in the front wall and downwardly from the fresh air opening to the first opening in the back wall.

7. A work vehicle as defined by claim 2 wherein the latch is mounted to the exterior wall of the operator's cab and projects into a latch hole formed in the back wall of the door when the door is closed.

8. A work vehicle as defined by claim 7 wherein the latch comprises a rubber sleeve that is bulged outwardly when the latch is in a latched position and which is unbulged when the latch is in an unlatched position.

9. A work vehicle as defined by claim 8 wherein the latch further comprises a rod slidably mounted in a fixed washer assembly, the rod having a first end on which is secured a jam nut and a second end on which is mounted a latch handle, the rubber sleeve is mounted on the rod between the jam nut and the washer assembly, the latch handle having camming surfaces defining the latched position and the unlatched position.

10. A work vehicle as defined by claim 2 wherein the door is provided with integral pivot studs that engage a bracket mounted to the operator's cab.

11. A work vehicle as defined by claim 10 wherein the door can be removed when the latch is in an unlatched position.

12. An operator's cab for a work vehicle, the operators cab defining an enclosed space, the operator's cab comprising:
- an exterior wall having an opening for receiving a fresh air filter and a fresh air duct in pneumatic communication with the fresh air filter;
- a door is mounted to the exterior wall, the door having a back wall with a first opening for receiving fresh air, the first opening being in pneumatic communication with the fresh air filter; and
- a latch for latching the door to the operator's cab, the latch being unlatched from inside the enclosed space of the operator's cab.

13. An operator's cab as defined by claim 12 wherein the door is pivotally mounted to the operator's cab.

14. An operator's cab as defined by claim 13 wherein the door has a front wall with a fresh air opening for receiving fresh air, the fresh air opening being in pneumatic communication with the first opening, the fresh air opening of the front wall being located above the first opening.

15. An operator's cab as defined by claim 14 wherein the front wall is provided with louvers defining a louvered opening for receiving fresh air the louvered opening being in pneumatic communication with the fresh air opening of the front wall, the louvered opening is located below the fresh air opening of the front wall, so that fresh air must first pass through the louvered opening upwards to the fresh air opening in the front wall and downwardly from the fresh air opening to the first opening in the back wall.

16. An operator's cab as defined by claim 13 wherein the latch is mounted to the exterior wall of the operator's cab and projects into a latch hole formed in the back wall of the door when the door is closed.

17. An operator's cab as defined by claim 16 wherein the latch comprises a rubber sleeve that is bulged outwardly when the latch is in a latched position and which is unbulged when the latch is in an unlatched position.

18. An operator's cab as defined by claim 17 wherein the latch further comprises a rod slidably mounted in a fixed washer assembly, the rod having a first end on which is secured a jam nut and a second end on which is mounted a latch handle, the rubber sleeve is mounted on the rod between the jam nut and the washer assembly, the latch handle having camming surfaces defining the latched position and the unlatched position.

19. An operator's cab as defined by claim 13 wherein the door is provided with integral pivot studs that engage a bracket mounted on the exterior wall.

20. An operator's cab as defined by claim 13 wherein the door can be removed from the exterior wall when the latch is in an unlatched position.

21. A door for holding a fresh air filter on a work vehicle, the door comprising:
- a back wall having a first opening through which fresh air is directed to a fresh air filter;
- a front wall having a fresh air opening located above the first opening said front wall is provided with louvers defining a louvered opening that is located below the fresh air opening of the front wall, so that fresh air must first pass through the louvered opening upwards to the fresh air opening in the front wall and downwardly from the fresh air opening to the first opening in the back wall; and
- two side walls each having integral pivot studs.

22. A door as defined by claim 21 wherein the door is hollow and made of roto molded plastic.

23. A door as defined by claim 21 wherein the back wall is provided with a latch hole for latching the door to an operator's cab.

* * * * *